United States Patent [19]

Pailles et al.

[11] Patent Number: 5,247,578
[45] Date of Patent: Sep. 21, 1993

[54] PROCESS FOR EXCHANGE OF RIGHTS BETWEEN MICROPROCESSOR CARDS

[75] Inventors: Jean-Claude Pailles, Epron; Patrick Remery, Caen; Francoise Vallee, Lantheuil, all of France

[73] Assignee: France Telecom Etablissement autonome de droit public (Centre National d'Etudes des Telecommunications), Issy les Moulineaux, France

[21] Appl. No.: 823,770

[22] Filed: Jan. 22, 1992

[30] Foreign Application Priority Data

Jan. 22, 1991 [FR] France .................. 91 00680

[51] Int. Cl.$^5$ .................. H04K 1/00; H04K 9/00; G06F 15/30
[52] U.S. Cl. .................. 380/24; 235/379; 235/380; 380/45
[58] Field of Search .................. 380/24, 45; 235/379, 235/380

[56] References Cited

U.S. PATENT DOCUMENTS

| | | | |
|---|---|---|---|
| 4,529,870 | 7/1985 | Chaum | 235/380 |
| 4,630,201 | 12/1986 | White | 235/379 |
| 4,746,788 | 5/1988 | Kawana | 235/380 |
| 4,792,973 | 12/1988 | Gilhousen et al. | 380/24 |
| 4,926,480 | 5/1990 | Chaum | 380/24 |
| 4,961,142 | 10/1990 | Elliott et al. | 235/380 |
| 5,036,461 | 7/1991 | Elliott et al. | 235/380 |
| 5,140,634 | 8/1992 | Guillou et al. | 380/24 |

FOREIGN PATENT DOCUMENTS

| | | |
|---|---|---|
| 0100260 | 2/1984 | European Pat. Off. |
| 0172670 | 2/1986 | European Pat. Off. |
| 0256768 | 2/1988 | European Pat. Off. |
| WO8102070 | 7/1981 | PCT Int'l Appl. |
| WO8504035 | 9/1985 | PCT Int'l Appl. |

OTHER PUBLICATIONS

L'Echo De's Recherches, No. 134, pp. 15-24, Oct. 1988, P. Remery, et al., "Le Paiement Electronique".

*Primary Examiner*—Stephen C. Buczinski
*Attorney, Agent, or Firm*—Oblon, Spivak, McClelland, Maier & Neustadt

[57] ABSTRACT

A process for exchange of rights between microprocessor cards, wherein multiple keys (K1, K2, ...) and varied keys (Ka5, Kb3) are used. A card to be debited calculates a voucher with varied key (Ka5) that the card to be credited reconstitutes. The process has application to electronic payment.

2 Claims, 4 Drawing Sheets

MULTIPLE KEYS K1, K2, ..., K10

KEYS VARIED BY (a)

Ka1, Ka2, ..., Ka10

KEYS VARIED BY (b)

Kb1, Kb2, ..., Kb10

CARD A
IDENTITY : a
ROW OF THE KEY u(a) =3
KEY : K3
VARIED KEY FOR
TRANSACTION WITH B :
Ka5

CARD B
IDENTITY : b
ROW OF THE KEY u(b) =5
KEY : K5
VARIED KEY FOR
TRANSACTION WITH A :
Kb3

FIG. 3

PROCESS FOR EXCHANGE OF RIGHTS BETWEEN MICROPROCESSOR CARDS

BACKGROUND OF THE INVENTION

1. Field of the Invention

This invention relates to a process for exchange of rights between microprocessor cards. The rights to be exchanged between microprocessor cards can be of any nature and provide access to various services. They are most often linked to financial transactions (credit, debit). The invention therefore finds a preferred application in what it is fitting to call "electronic payment." In the case of such transactions, the cards constitute electronic "purses."

2. Discussion of Background

The use of electronic purses is possible only if certain conditions are met: the security of the exchange has to be total, the cards have to be unable to be counterfeited, regardless of the handlings that they undergo, and finally counterfeit purses must be impossible to produce.

Resorting to the technology of memory cards is justified to the extent that this technology uses components especially designed to offer a very high level of security. These components consist of a "monochip" chip comprising a microprocessor with its programs, its memories and its input-output means. Memories and input-output means are under the control of the microprocessor and its program, which cannot be modified externally.

The first level of security to be assured relates to the exchange of rights between cards so that it is impossible to simulate a reloading of one's own card, which would amount to creating counterfeit money.

The security of the exchange relies on standard techniques of data-processing security. It involves guaranteeing the integrity and the authenticity of the message sent by the debit card to the credit card.

FIG. 1 illustrates an example of known procedure to assure an exchange in total security. Such a procedure is described, for example, in the article of P. REMERY, J. C. PAILLES, F. LAY titled "Electronic Payment" published in the journal "L'écho des Recherches" ["The Echo of Research"], no. 134, 4th quarter 1988, pages 15-24.

In the transaction illustrated in FIG. 1, there are the following operations:

- card A to be debited is defined by an identity (a) and it exhibits a credit balance; card B to be credited is defined by an identity (b) and by a number N which is, for example, the number of transactions that it has already performed;
- card B begins by identifying itself to card A to be debited by sending its identity (b) and number N to it; it also indicates amount M that it desires to receive;
- card A verifies if its balance is at least equal to requested amount M;
- in the negative, the debit order would be refused; in the affirmative, card A reduces its balance by amount M and calculates a voucher C (or proof), which is a function F of amount M, of identity (b) of card B to be credited and of number N, or F(M,b,N);
- card A sends this voucher F(M,b,N) to card B;
- the latter receives the voucher F(M,b,N) and, by the inverse function of function F, calculates an amount M, an identity (b) and a number N;
- card B verifies if the amount thus calculated is indeed requested amount (M), if the calculated identity is indeed its own (b) and if the calculated number is indeed the number that it had selected (N);
- in the affirmative, card B increments number N by one unit for the next transaction and increases its balance by amount M in question.

FIG. 2 illustrates how the electronic money can circulate in a system equipped with cards able to use the process which has just been described. An issuer of money 10 has authorized banks 20 and 30, each containing use working accounts (a) and (b). The users possess cards 25, 35 able to exchange rights with the banks.

In the diagram illustrated, bank 20 is supposed to have loaded card 25 with an amount of 100 F (operation 1); card 25 has been debited by 50 F (operation 2) for the benefit of card 35. The latter has been debited by 200 F for the benefit of its bank 30 (operation 3).

If this procedure is already satisfactory in some respects, it remains to solve the problem of the selection of function F that is used to calculate voucher C.

It is clear that this function is to be able to be calculated only by purse cards, and not by a PC type computer, for example, otherwise the simulation of a reloading of one's own card would be easy. A first solution consists in taking up a function F which is secret. A second solution consists in defining F by one (or more) secret key(s), so that it is impossible to perform a transaction without the knowledge of this (or these) key(s).

The invention is oriented toward this second solution, the first being not very reliable, for the reason that secret F cannot be guaranteed, in particular because of the necessity for writing and testing the program making it possible to calculate F during the development of such a card.

With the second solution, the security of the system will depend on the ability of function F to withstand attempted fraud.

More precisely, the question is to know if, by knowing parameters M (amount), b (identity of the card to be credited), N (number of transactions already performed) and voucher $C=F_K(M,b,N)$, where function F depends on a key K, it is possible to get back to key K used by identity card a.

If so, the secret would be penetrated and it would be possible to simulate reloadings of any card (b), since calculation $F_K(M,b,N)$ would be possible whatever (b) may be. In practical terms, it would be possible to produce software on a PC computer and a card reader making it possible to reload any card.

This software and the computer using it would therefore constitute a card "clone" that could be used for reloading any card by simulating the debit of a counterfeit card (a') and the credit of a genuine card (b). The counterfeit money thus created would be in some way "laundered" after this operation and nothing would make it possible any longer to distinguish, in card b, what comes from any particular reloading.

A swindler wanting to discover a key K has two possibilities:

a) either the physical investigation of the memory of the card by instruments such as an electron microscope, b) or the cryptanalysis of the vouchers (or proofs) produced by the debited card, by hoping, with the largest known computers, to solve the equation $C = F_K(M,b,N)$ where C, P, b, N are known and K is unknown.

To avoid the first type of fraud, there are no other solutions than to hide the sensitive parts of the component (memory, bus) by metal screens. Furthermore, it is not necessary that the investigation of a card provide all the secrets of the system, therefore make possible simulating any debit card, because then there would no longer be means to detect the frauds.

To avoid the second type of fraud, it is possible to think of two responses:
- to select a function F "hard" to decipher, the difficulty is that it is difficult to evaluate the hardness of a cryptographic function,
- to change regularly (every month, for example), the key of the cards, in particular when they are reloaded; in this case, the life of a clone is limited (to one month in the example given).

DISCUSSION OF THE BACKGROUND

Accordingly, one object of this invention is to provide another, more effective, process based on a system with varied multiple keys. This is achieved, according to the present invention, in that the key used to make up the voucher is obtained from one of the keys of a unit, this key being varied as a function of the identity of the card to be credited. Thus, the key used changes with the identity of the card to be credited. To constitute a device able to simulate a debit operation in connection with a card to be credited would require a knowledge of all the keys of the unit. The difficulty of fraud is therefore considerably increased relative to the single key methods.

Thus, the present invention provides a new and improved process for exchange of rights between microprocessor cards of the type of above described, wherein a function F being used to calculate voucher C is defined and used by the following operations:
- providing multiple ciphering keys [K1, K2, ..., Km, ..., Kn, ...), which are defined previously,
- providing a card to be credited (B) one of these multiple keys, or (Kn), where key number n is a function (u) of identity (b) of card (B), (u(b)=n),
- providing a card to be debited (A) certain varied keys Ka1, Ka2, ..., Kan, ... which are each a function of multiple keys K1, k2, ... and of identity (a) of card (A) to be debited, these varied keys being loaded in card (A) during its customization,
- providing the card (A) to be debited the identity (b) of card (B) to be credited and having card (A) calculate row n of the varied key to be used by function u(b) and deduct from it that of varied keys Kan, with which it is to calculate voucher (C),
- having card (B) to be credited calculate varied key Kan which was used in the calculation of the voucher that it received and the latter with its own key (Kn) and identity (a) corresponding to card (A) to be debited, card (B) to be credited then being able to decipher voucher (C) with this varied key Kan.

Preferably, the system is symmetrical, in that each card can be either debited or credited. In this case, card (A) further contains one of the multiple keys, either Km, where key number m is a function (u) of the identity of the card (u(a)=m) and, symmetrically, card (B) contains varied keys Kb1, Kb2, ..., Kbm, making it possible for it to calculate a voucher intended in particular for a card A of identity m with varied key Kbm, card A receiving such a voucher reconstituting this key with its key Km and with b.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing, wherein:

FIG. 3 is an illustration of the contents of the cards in a process according to the invention in a symmetrical variant.

DESCRIPTION OF THE PREFERRED EMBODIMENTS

Figure 1:
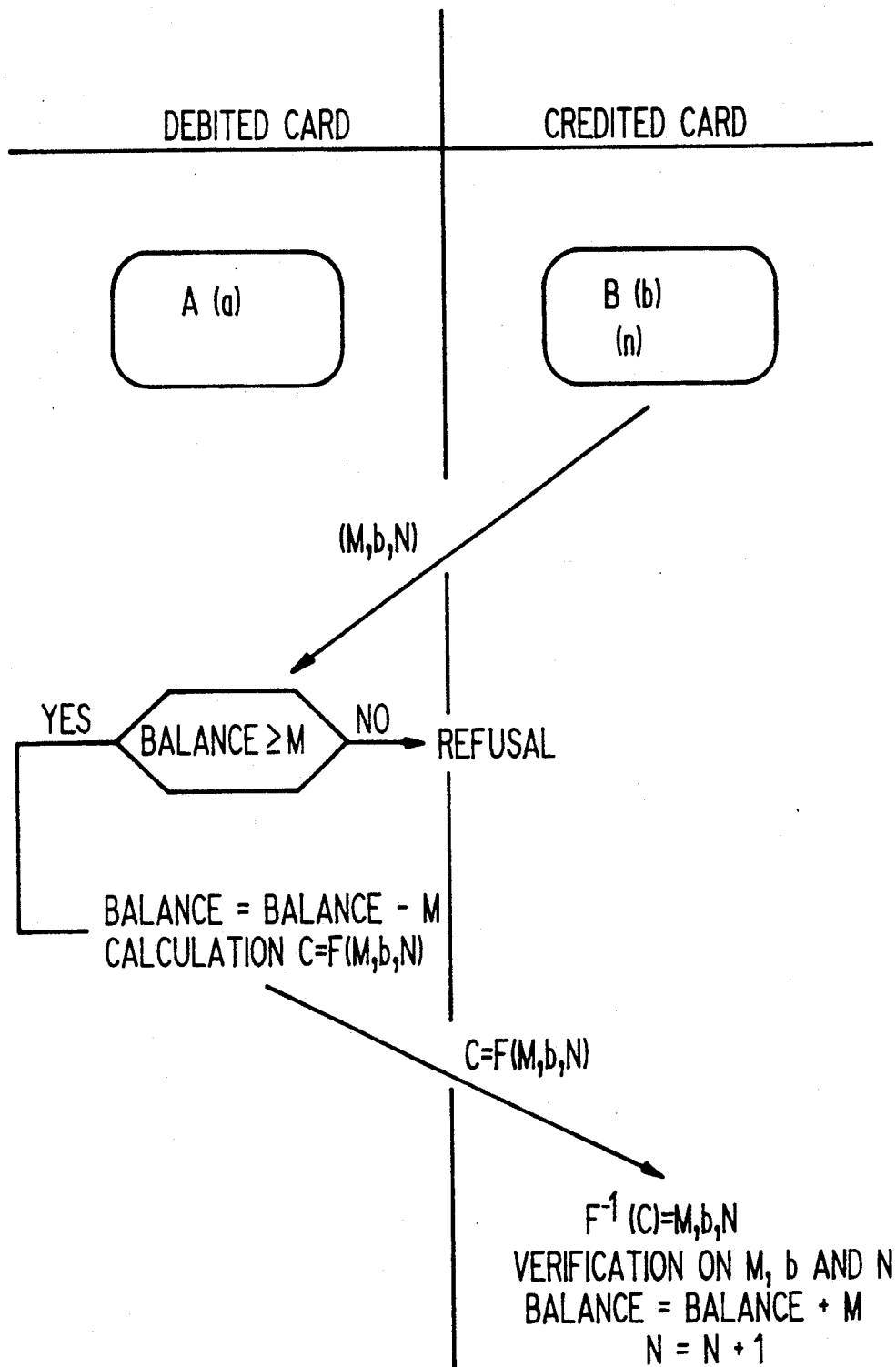
FIG. 1, already described, is a schematic illustration of a process according to the prior art.
Figure 2:
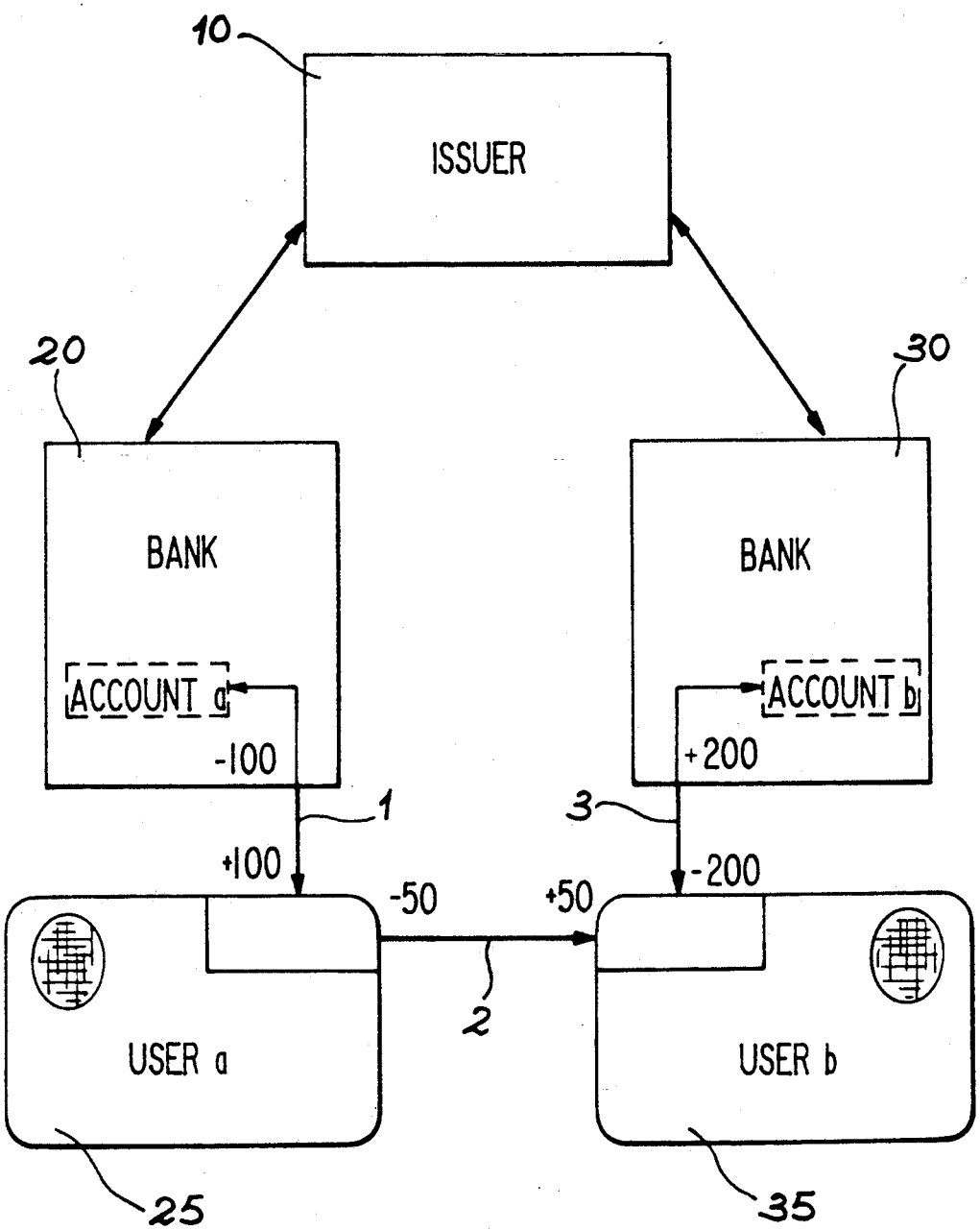
FIG. 2, already described, is a schematic diagram illustrating the circulation of electronic money.

Referring now to the drawings, wherein like reference numerals designate identical or corresponding parts throughout the several views, and more particularly to FIG. 3 thereof, in FIG. 3, a symmetrical situation is represented where each card (A or B) can perform a transaction with the other (B or A).

It is assumed that ten keys K1, K2, ..., K10 have been selected, this number 10 being naturally arbitrary and not limiting the invention at all. Card A is identified by an identity (a). It is possible to constitute a function of this identity (a) and of each of keys K1, K2, ..., K10 to obtain ten varied keys Ka1, Ka2, ..., Ka10.

In the same way, card B being identified by an identity (b), ten varied keys Kb1, Kb2, ..., Kb10 are constituted.

Further, a row in the order of the keys corresponds to identity (a) by a given function u. In the example illustrated, u(a) is assumed to be equal to 3. This means that card A is assigned key K3.

In the same way, identity (b) defines a row u(b), which, in the example illustrated, is assumed equal to 5. This means that card B is assigned key K5.

To work with card B, whose row of the key is 5, card A is provided with the fifth varied key pertaining to A, or Ka5.

To work with card A, whose row of the key is 3, card B is provided with the third varied key pertaining to B, or Kb3.

In a more general way, for transactions to be performed with cards other than B, it would be necessary to write in card A other varied keys Ka1, Ka2, ... or ten keys at most.

Also, in card B, where, to work with cards other than A, it would be necessary to provide other varied keys Kb1, Kb2, ... or ten keys at most.

Figure 4:
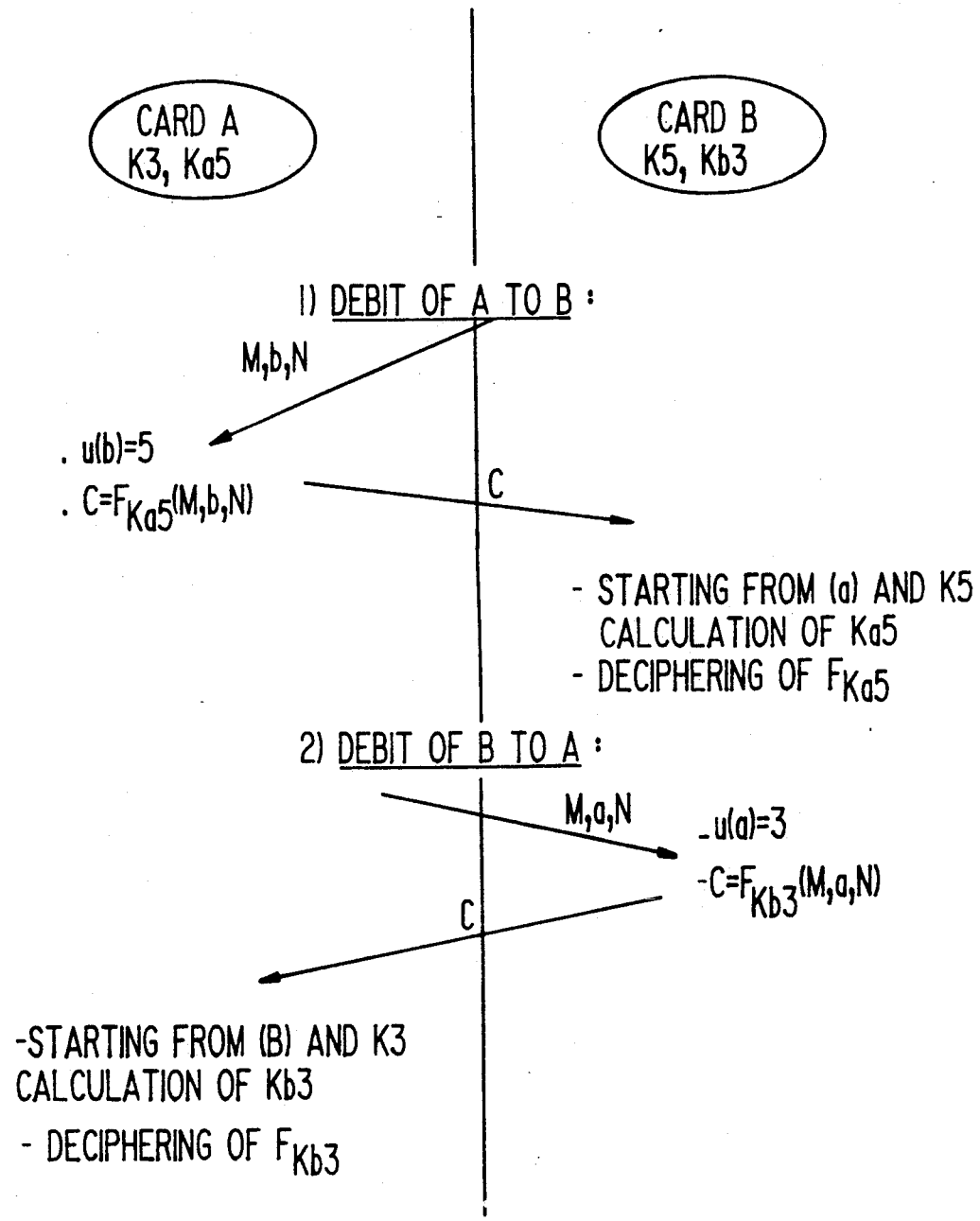
FIG. 4 is an illustration of two symmetrical transactions, one of debit of A to B, the other of debit of B to A.

Equipped with these various keys, cards A and B can perform transactions in both directions as illustrated in FIG. 4. In this figure, the known operations for verifying the balance, for reducing the latter in the debited card, for increasing the balance in the credited card, for verifying parameters and incrementing of number N are not represented because they are performed as in the prior art (cf. FIG. 1). The two symmetrical operations pertaining to the invention are then:

a) DEBIT OF A FOR THE BENEFIT OF B

Card B transmits to card A its request with amount M, identity (b), number N;

card A uses varied key Ka5 to calculate voucher C;
card A transmits voucher C to card B;
starting from identity (a) of A and from key K5 that it possesses, card B calculates Ka5 which makes it possible for it to decipher voucher C.

2) DEBIT OF B FOR THE BENEFIT OF A

Card A transmits to card B its request with amount M, identity (a) and number N;

card B uses varied key Kb3 to calculate voucher C;
card B transmits voucher C to card A;
starting from identity (b) of B and key K3 that it possesses, card A calculates Kb3, which makes it possible for it to decipher voucher C.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by letters patent of the United States is:

1. Process for exchange of rights between microprocessor cards consisting in debiting a first card (A) by a certain amount (M) and in crediting a second card (B) by this same amount (M), wherein:

cards (A) and (B) are identified by identities, respectively (a) and (b), card (B) to be credited identifies itself to card (A) to be debited by sending its identity (b) and a number (N) that it has selected to card (B) and card (B) indicates an amount (M) of the rights to be exchanged, card (A) to be debited verifies if its balance of rights is at least equal to requested amount (M), in the affirmative, card (A) to be debited reduces its balance of amount (M) and calculates a voucher, which is a function F of amount (M), of identify (b) of card (B) to be credited and of number (N), or F(M,b,N), card (A) to be debited sends this voucher F(M,b,N) to card (B) to be credited, card (B) to be credited receives this voucher F(M,b,N), and deducts from it amount (M), identity (b) and number (N), card (B) to be credited verifies if calculated amount (M) is indeed the requested amount (M), if the calculated identity (b) is indeed its own and if the calculated number (N) is indeed number (N) that it had selected, in the affirmative, card (B) to be credited changes number (N) for the next exchange and exchanges its balance of amount (M) in question, this process comprising using the function F to calculate voucher C, as defined and used by the following operations:

defining in advance multiple ciphering keys (K1, K2, ..., Km, ..., Kn, ...), storing in card (B) to be credited one of these multiple keys, or (Kn), where key number n is a function (u) of identity (b) of card (B), (u(b)=n), storing in card (A) to be debited certain varied keys Ka1, Ka2, ..., Kan, ... which are each a function of multiple keys K1, K2, ... and of identity (a) of card (A) to be debited, these varied keys being loaded in card (A) during its customization, having card (A) to be debited receive identity (b) of card (B) to be credited and calculate row n of the varied key by function u(b) and deduct from it that of varied keys Kan with which it is to calculate voucher (C), having card (B) to be credited calculate varied key Kan which was used in the calculation of the voucher that it received and this with its own key (Kn) and with identity (a) corresponding to card (A) to be debited, card (B) to be credited then being able to decipher voucher C with this varied key Kan.

2. Process according to claim 1, wherein each card (A) or (B) is to be either debited or credited:

storing in card (A) one of the multiple keys, or Km, where key number m is a function (u) of the identity of the card (u(a)=m), storing in card (B) varied keys Kb1, Kb2, ..., Kbm, making it possible for card (B) to calculate a voucher intended in particular for a card (A) of identity m with varied key Kbm, card (A) receiving such a voucher reconstituting this key with its key Km and with b.

* * * * *